US009934451B2

(12) United States Patent
Nister et al.

(10) Patent No.: US 9,934,451 B2
(45) Date of Patent: Apr. 3, 2018

(54) STEREOSCOPIC OBJECT DETECTION LEVERAGING ASSUMED DISTANCE

(71) Applicant: MICROSOFT TECHNOLOGY LICENSING, LLC, Redmond, WA (US)

(72) Inventors: David Nister, Bellevue, WA (US); Piotr Dollar, Redmond, WA (US); Wolf Kienzle, Bellevue, WA (US); Mladen Radojevic, Valjevo (RS); Matthew S. Ashman, Seattle, WA (US); Ivan Stojiljkovic, Belgrade (RS); Magdalena Vukosavljevic, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 127 days.

(21) Appl. No.: 13/926,882

(22) Filed: Jun. 25, 2013

(65) Prior Publication Data

US 2014/0376770 A1    Dec. 25, 2014

(51) Int. Cl.
*G06K 9/00* (2006.01)
*G06K 9/62* (2006.01)
(Continued)

(52) U.S. Cl.
CPC ........... *G06K 9/6256* (2013.01); *G06F 3/017* (2013.01); *G06K 9/00375* (2013.01);
(Continued)

(58) Field of Classification Search
None
See application file for complete search history.

(56) References Cited

U.S. PATENT DOCUMENTS 5,646,679 A * 7/1997 Yano et al. ..................... 348/47
6,426,745 B1   7/2002 Isaacs et al.
(Continued)

FOREIGN PATENT DOCUMENTS

| GB | 2477333 A | 8/2011 |
| JP | 2011243025 A | 12/2011 |
| WO | 2013034294 A1 | 3/2013 |

OTHER PUBLICATIONS

Appenrodt, et al., "Multi Stereo Camera Data Fusion for Fingertip Detection in Gesture Recognition Systems", Retrieved at <<http://ieeexplore.ieee.org/stamp/stamp.jsp?tp=&arnumber=5685854>>, In International Conference of Soft Computing and Pattern Recognition, Dec. 7, 2010, pp. 6.
(Continued)

*Primary Examiner* — Vikkram Bali
(74) *Attorney, Agent, or Firm* — Alleman Hall Creasman & Tuttle LLP (57) ABSTRACT

A method of object detection includes receiving a first image taken by a first stereo camera, receiving a second image taken by a second stereo camera, and offsetting the first image relative to the second image by an offset distance selected such that each corresponding pixel of offset first and second images depict a same object locus if the object locus is at an assumed distance from the first and second stereo cameras. The method further includes locating a target object in the offset first and second images.

19 Claims, 9 Drawing Sheets

(51) Int. Cl.
*G06F 3/01* (2006.01)
*G06T 7/73* (2017.01)

(52) U.S. Cl.
CPC ....... *G06K 9/00536* (2013.01); *G06K 9/6292* (2013.01); *G06T 7/73* (2017.01)

(56) References Cited

U.S. PATENT DOCUMENTS

| | | | |
|---|---|---|---|
| 6,813,040 B1* | 11/2004 | Uchino | H04N 1/2158 358/1.9 |
| 7,099,510 B2 | 8/2006 | Jones et al. | |
| 7,248,968 B2 | 7/2007 | Reid | |
| 7,366,330 B2 | 4/2008 | Ito | |
| 7,512,262 B2 | 3/2009 | Criminisi et al. | |
| 7,729,512 B2 | 6/2010 | Nishiyama | |
| 7,876,954 B2 | 1/2011 | Kim et al. | |
| 7,957,567 B2 | 6/2011 | Yamaguchi | |
| 8,094,928 B2 | 1/2012 | Graepel et al. | |
| 9,071,759 B2* | 6/2015 | Mori | H04N 5/23216 |
| 2007/0047822 A1 | 3/2007 | Kitamura et al. | |
| 2007/0172099 A1 | 7/2007 | Park et al. | |
| 2011/0255741 A1 | 10/2011 | Jung et al. | |
| 2011/0255743 A1 | 10/2011 | Guan et al. | |
| 2011/0285826 A1* | 11/2011 | Bickerstaff et al. | 348/47 |
| 2011/0316972 A1* | 12/2011 | Demas et al. | 348/43 |
| 2012/0113223 A1 | 5/2012 | Hilliges et al. | |
| 2012/0170805 A1 | 7/2012 | Brown et al. | |
| 2012/0219210 A1 | 8/2012 | Ding et al. | |
| 2012/0309532 A1 | 12/2012 | Ambrus et al. | |
| 2014/0133758 A1 | 5/2014 | Kienzle | |
| 2015/0309316 A1* | 10/2015 | Osterhout | G06F 3/0488 345/8 |

OTHER PUBLICATIONS

Hungy, et al., "Free-Hand Pointer by Use of an Active Stereo Vision System", Retrieved at <<http://people.cs.nctu.edu.tw/~yschen/papers/ICPR98-pointer.pdf>>, In 14th International Conference on Pattern Recognition, vol. 2, Aug. 16, 1998, pp. 3.

ISA European Patent Office, International Search Report & Written Opinion for PCT Application No. PCT/US2014/043545, dated Oct. 6, 2014, 12 Pages.

Coates, et al., "Multi-Camera Object Detection for Robotics", In IEEE International Conference on Robotics and Automation, May 3, 2010, pp. 412-419.

Benenson, et al., "Pedestrian Detection at 100 Frames Per Second", Retrieved at <<http://ieeexplore.ieee.org/stamp/stamp.jsp?tp=&arnumber=6248017>>, In IEEE Conference on Computer Vision and Pattern Recognition, Jun. 16, 2012, 8 Pages.

Bourdev, et al., "Robust Object Detection Via Soft Cascade", Retrieved at <<http://ieeexplore.ieee.org/stamp/stamp.jsp?tp=&arnumber=1467448>>, In Proceedings of the IEEE Computer Society Conference on Computer Vision and Pattern Recognition, vol. 2, Jun. 20, 2005, 8 Pages.

Breitenstein, et al., "Robust Tracking-by-Detection using a Detector Confidence Particle Filter", Retrieved at <<http://www.mmp.rwth-aachen.de/publications/pdf/breitenstein-detectorconfidencefilter-iccv09.pdf>>, In the proceeding IEEE 12th International Conference on Computer Vision, Sep. 29, 2009, 8 Pages.

Buchmann, et al., "FingARtips—Gesture Based Direct Manipulation in Augmented Reality", In Proceedings of the 2nd international conference on Computer graphics and interactive techniques in Australasia and South East Asia; Jun. 2004, 10 pages.

Butko, et al., "Optimal Scanning for Faster Object Detection", Retrieved at <<http://ieeexplore.ieee.org/stamp/stamp.jsp?tp=&arnumber=5206540>>, In IEEE Conference on Computer Vision and Pattern Recognition, Jun. 20, 2009, 8 Pages.

Çapin, et al. "Camera-based virtual environment interaction on mobile devices.", Computer and Information Sciences—ISCIS, Nov. 2006, Springer Berlin Heidelberg, 9 pages.

Carl, "Meta's 3d Gesture-controlled Augmented Reality Glasses", http://www.kitguru.net/channel/generaltech/carl/metas-3d-gesture-controlled-augmented-reality-glasses/, KitGuru, Feb. 2, 2013, 4 pages.

Liat Clark, "Nasa's augmented reality app lets you control curiosity Mars rover", http://www.wired.co.uk/news/archive/2012-07/12/nasa-augmented-reality-app#viewgallery/285867, Jul. 12, 2012, 6 pages.

Dalal, et al., "Histograms of Oriented Gradients for Human Detection", Retrieved at <<http://ieeexplore.ieee.org/stamp/stamp.jsp?tp=&arnumber=1467360>>, In IEEE Computer Society Conference on Computer Vision and Pattern Recognition, vol. 1, Jun. 25, 2005, 8 Pages.

Dollar, et al., "Crosstalk cascades for frame-rate pedestrian detection." Computer Vision—ECCV 2012. Springer Berlin Heidelberg, Oct. 2012, 14 pages.

Dollar, et al., "Integral Channel Features", Retrieved at <<http://www.loni.ucla.edu/~ztu/publication/dollarBMVC09ChnFtrs_0.pdf>>, In British Machine Vision Conference, Sep. 7, 2009, 11 Pages.

Dollar, et al., "Pedestrian Detection: An Evaluation of the State of the Art", Retrieved at <<http://ieeexplore.ieee.org/stamp/stamp.jsp?arnumber=05975165>>, In Journal of IEEE Transactions on Pattern Analysis and Machine Intelligence, vol. 34, Issue 4, Apr. 2012, 19 Pages.

Dollar, et al., "The Fastest Pedestrian Detector In the West", Retrieved at <<http://www.bmva.org/bmvc/2010/conference/paper68/paper68.pdf>>, In Proceedings of the British Machine Vision Conference, Aug. 31, 2010, 11 Pages.

Everingham, et al., "The PASCAL Visual Object Classes (VOC) Challenge", Retrieved at <<http://citeseerx.ist.psu.edu/viewdoc/download?doi=10.1.1.167.6629&rep=rep1&type=pdf>>, In International Journal of Computer Vision, vol. 88, Issue 2, Jun. 2010, 36 Pages.

Felzenszwalb, et al., "Cascade Object Detection with Deformable Part Models", Retrieved at <<http://ieeexplore.ieee.org/stamp/stamp.jsp?tp=&arnumber=5539906>>, In IEEE Conference on Computer Vision and Pattern Recognition, Jun. 13, 2010, 8 Pages.

Felzenszwalb, et al., "Efficient Matching of Pictorial Structures", Retrieved at <<http://ieeexplore.ieee.org/stamp/stamp.jsp?tp=&arnumber=854739>>, In Proceedings of the IEEE Conference on Computer Vision and Pattern Recognition, vol. 2, Jun. 13, 2000, 8 Pages.

Felzenszwalb, et al., "Object Detection with Discriminatively Trained Part Based Models", Retrieved at <<http://citeseerx.ist.psu.edu/viewdoc/download?doi=10.1.1.160.9889&rep=rep1&type=pdf>>, In IEEE Transactions on Pattern Analysis and Machine Intelligence, Jun. 4, 2009, 38 Pages.

Fleuret, et al., "Coarse-to-Fine Face Detection", Retrieved at <<http://citeseerx.ist.psu.edu/viewdoc/download;jsessionid=0A933FD584DE9636190CEF8169557816?doi=10.1.1.169.5548&rep=rep1&type=pdf>>, In International Journal of Computer Vision—Special Issue on Statistical and Computational Theories of Vision, vol. 41, Issue 1-2, Jan. 2001, 23 Pages.

Friedman, et al., "Additive Logistic Regression: A Statistical View of Boosting", Retrieved at <<http://www.stanford.edu/—hastie/Papers/AdditiveLogisticRegression/alr.pdf>>, The Annual of Statistics, vol. 28, Issue 2, Apr. 2000, 38 Pages.

Frome, et al., "Large-scale Privacy Protection in Google Street View", Retrieved at <<http://static.googleusercontent.com/external_content/untrusted_dlcp/research.google.com/en//archive/papers/cbprivacy_iccv09.pdf>>, In the IEEE 12th International Conference on Computer Vision, Sep. 29, 2009, 8 Pages.

Gould, et al., "Region-based Segmentation and Object Detection", Retrieved at <<http://www.stanford.edu/~tianshig/papers/nips09-sceneObject.pdf>>, In the Twenty-Fourth Annual Conference on Neural Information Processing Systems, Dec. 9, 2009, 9 Pages.

Gualdi, et al., "Multi-Stage Sampling with Boosting Cascades for Pedestrian Detection in Images and Videos", Retrieved at <<http://www.cvpapers.com/papers/ECCV2010.pdf>>, In Proceedings of the 11th European Conference on Computer Vision, vol. 6316, Sep. 5, 2010, 14 Pages.

(56) References Cited

OTHER PUBLICATIONS

Gualdi, et al., "A Multi-Stage Pedestrian Detection Using Monolithic Classifiers", Retrieved at <<http://ieeexplore.ieee.org/stamp/stamp.jsp?tp=&arnumber=6027335>>, In 8th IEEE International Conference on Advanced Video and Signal-Based Surveillance, Aug. 30, 2011, 6 Pages.

Ha, et al., "An interactive 3D movement path manipulation method in an augmented reality environment." Interacting with Computers 24.1, Jan. 2012, 15 pages.

Hürst, et al, "Gesture-based interaction via finger tracking for mobile augmented reality." Multimedia Tools and Applications 62.1, Jan. 2012, 26 pages.

Kondori, et al., "Real 3D interaction behind mobile phones for augmented environments." 2011 IEEE International Conference on Multimedia and Expo (ICME), Jul. 2011, 6 pages.

Lampert, et al., "Efficient Subwindow Search: A Branch and Bound Framework for Object Localization", Retrieved at <<http://ieeexplore.ieee.org/stamp/stamp.jsp?tp=&arnumber=5166448>>, In Journal of IEEE Transactions on Pattern Analysis and Machine Intelligence, vol. 31, Issue 12, Dec. 2009, 14 Pages.

Masnadi-Shirazi, et al., "High Detection-Rate Cascades for Real-Time Object Detection", Retrieved at <<http://ieeexplore.ieee.org/stamp/stamp.jsp?tp=&arnumber=4408860>>, In IEEE 11th International Conference on Computer Vision, Oct. 14, 2007, 6 Pages.

Mossel, et al., "3DTouch and HOMER-S: Intuitive Manipulation Techniques for One-Handed Handheld Augmented Reality." 15th International Conference on Virtual Reality and Converging Technologies, Laval, France; Mar. 2013, 10 pages.

Mossel et al., "DrillSample: Precise Selection in Dense Handheld Augmented Reality Environments." Laval Virtual VRIC'13, Mar. 2013, 10 pages.

Osaki et al., "Direct-manipulation interface for collaborative 3D drawing in the real world. In Robot and Human" The 15th IEEE International Symposium on Interactive Communication, Sep. 2006, 6 pages.

Pedersoli, et al., "A Coarse-to-Fine Approach for Fast Deformable Object Detection", Retrieved at <<http://eprints.pascal-network.org/archive/00008320/01/pedersoli11.pdf>>, In 24th IEEE Conference on Computer Vision and Pattern Recognition, Jun. 20, 2011, 8 pages.

Radkowski et al., "Interactive hand gesture-based assembly for augmented reality applications." The Fifth International Conference on Advances in Computer-Human Interactions, Jan. 2012, 6 pages.

Sochman, et al., "Waldboost—Learning for Time Constrained Sequential Detection", Retrieved at <<http://ieeexplore.ieee.org/stamp/stamp.jsp?tp=&arnumber=1467435>>, In Proceedings of the IEEE Computer Society Conference on Computer Vision and Pattern Recognition, vol. 2, Jun. 20, 2005, 7 Pages.

Vempati, et al., "Generalized RBF Feature Maps for Efficient Detection", Retrieved at <<http://www.vlfeat.org/~vedaldi/assets/pubs/sreekanth10generalized.pdf>>, In Proceedings of the British Machine Vision Conference, Aug. 31, 2010, 11 Pages.

Viola, et al., "Rapid Object Detection Using a Boosted Cascade of Simple Features", Retrieved at <<http://ieeexplore.ieee.org/stamp/stamp.jsp?tp=&arnumber=990517>>, Proceedings of the IEEE Computer Society Conference on Computer Vision and Pattern Recognition, vol. 1, Dec. 8, 2001, 8 Pages.

Wei, et al., "Efficient Histogram-Based Sliding Window", Retrieved at <<http://research.microsoft.com/en-us/people/yichenw/cvpr10_ehsw.pdf>>, In the 2010 IEEE Conference on Computer Vision and Pattern Recognition (CVPR), Jun. 13, 2010, 8 Pages.

Xiao, et al., "Boosting Chain Learning for Object Detection", Retrieved at <<http://ieeexplore.ieee.org/stamp/stamp.jsp?tp=&arnumber=1238417>>, In Proceedings of the Ninth IEEE International Conference on Computer Vision, Oct. 13, 2003, 7 Pages.

Zhang, et al., "Multiple-Instance Pruning for Learning Efficient Cascade Detectors", Retrieved at <<http://sdpy.googlecode.com/svn/tags/temp/unsorted3/to_delete/tmp/unsorted/to_remove/research/my_papers/tag/phdthesis_1st_submission_in_May/review/survey/cascade/NIPS2007_0575.pdf>>, In Advances in Neural Information Processing Systems, Dec. 3, 2007, 8 Pages.

Zhu, et al., "Fast Human Detection Using a Cascade of Histograms of Oriented Gradients", Retrieved at <<http://ieeexplore.ieee.org/stamp/stamp.jsp?tp=&arnumber=1640933>>, In IEEE Computer Society Conference on Computer Vision and Pattern Recognition, vol. 2, Jun. 17, 2006, 8 Pages.

IPEA European Patent Office, Written Opinion Issued in Application No. PCT/US2014/043545, dated May 13, 2015, WIPO, 8 pages.

IPEA European Patent Office, International Preliminary Report on Patentability Issued in PCT Application No. PCT/US2014/043545, dated Sep. 7, 2015, WIPO, 9 Pages.

* cited by examiner

STEREOSCOPIC OBJECT DETECTION LEVERAGING ASSUMED DISTANCE

BACKGROUND

Computing systems utilize a variety of different input mechanisms for receiving commands from users. For example, many computing systems utilize keyboards and computer mice that allow a user to control the computing system. More natural input mechanisms may be beneficial but have been difficult to implement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method of object detection includes receiving a first image taken by a first stereo camera, receiving a second image taken by a second stereo camera, and offsetting the first image relative to the second image by an offset distance selected such that each corresponding pixel of offset first and second images depict a same object locus if the object locus is at an assumed distance from the first and second stereo cameras. The method further includes locating a target object in the offset first and second images.

DETAILED DESCRIPTION

The methods and systems described herein may be used for accurate finger detection using stereo images. The present disclosure leverages an assumed distance (e.g., the length of a user's typical reach) to accurately detect a finger using stereo cameras having a known distance between the cameras.

Figure 1:
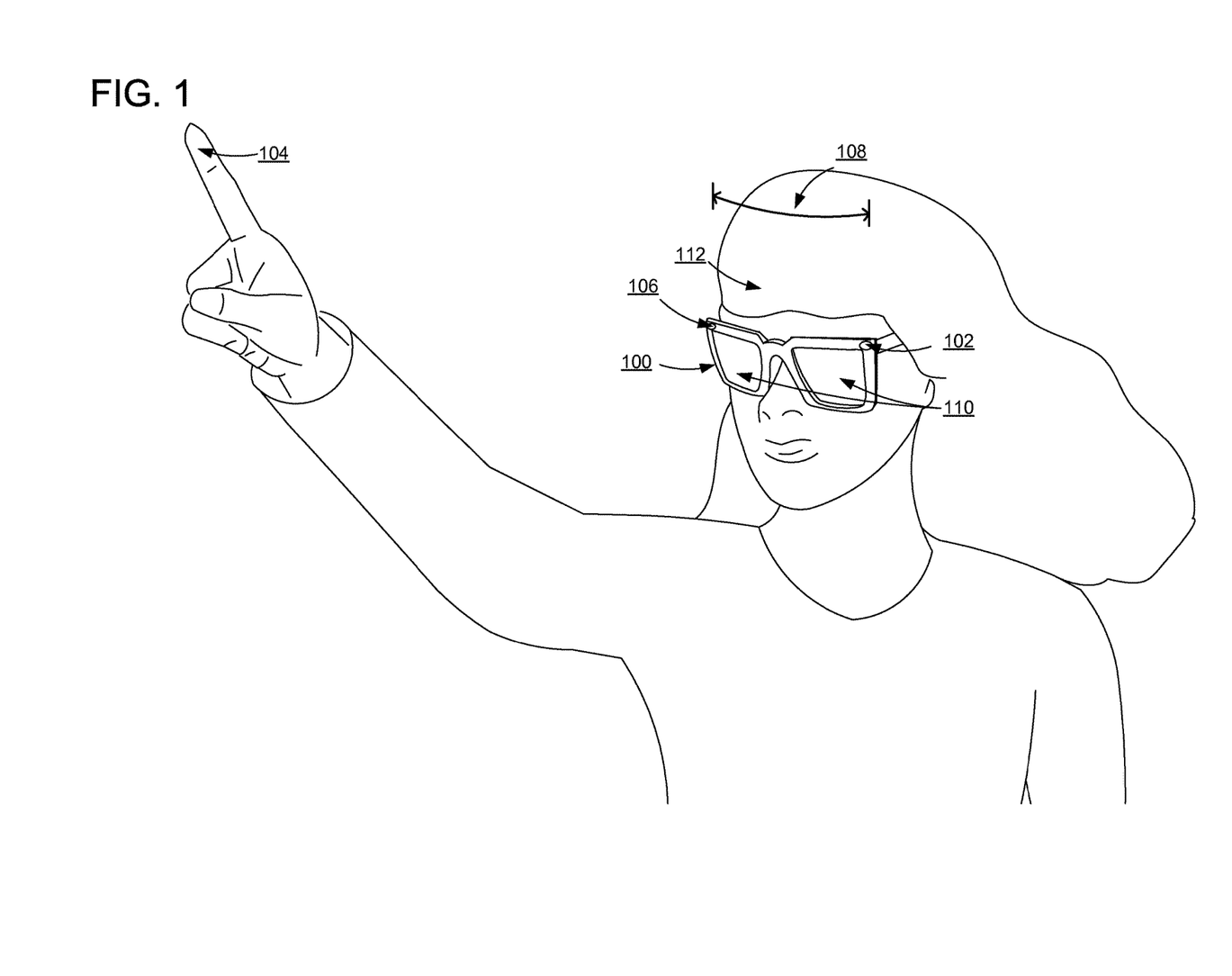
FIG. 1 shows an example head mounted display configured to detect finger gestures.

FIG. 1 shows an example head mounted display 100 configured to detect finger gestures and/or other objects. The example head mounted display 100 includes a first stereo camera 102 configured to capture a first image of finger 104 and a second stereo camera 106 configured to capture a second image of finger 104. As shown, the first stereo camera 102 has a distance 108 from the second stereo camera 106.

The head mounted display 100 may also include a see-through display 110 configured to display augmented reality images to the user 112. Such augmented reality images may include interactive targets that may be activated or otherwise engaged by finger gestures from user 112.

Figure 2:
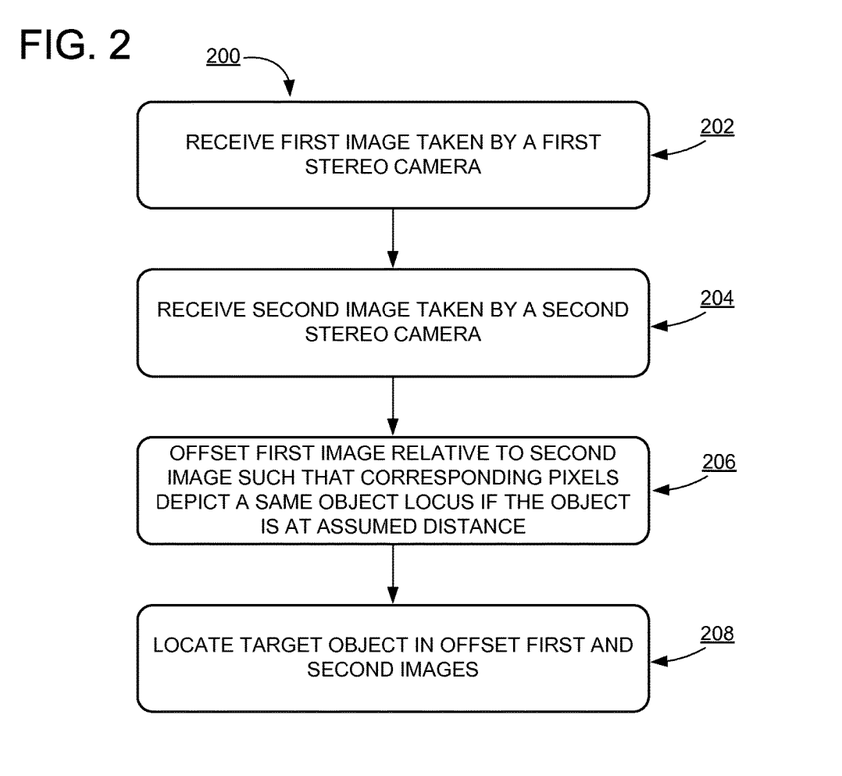
FIG. 2 shows an example method of object detection.

FIG. 2 shows an example method 200 of finger detection using stereo images. Method 200 may be used for finger detection by head mounted display 100 or by any device that receives images from and/or includes a first stereo camera and a second stereo camera. Further, method 200 may be used to detect virtually any type of object. Finger detection is provided as a non-limiting example.

Figure 3A:
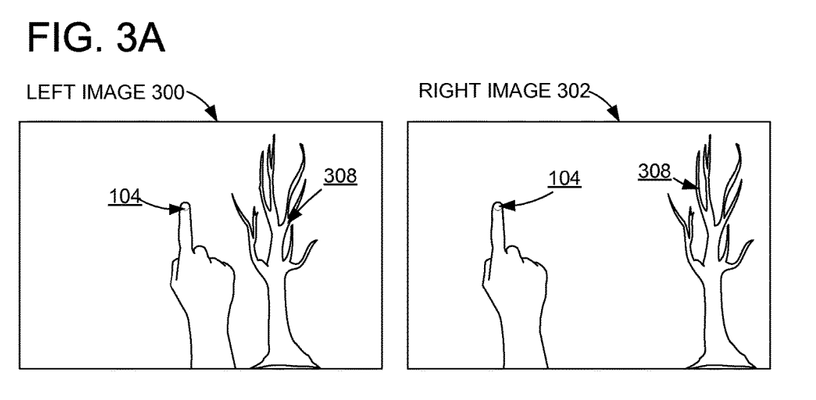
FIGS. 3A-3C shows a first image taken by a first stereo camera, a second image taken by a second stereo camera, and offset first and second images.

At 202, method 200 includes receiving a first image taken by a first stereo camera, and at 204, method 200 includes receiving a second image taken by a second stereo camera. In the example shown in FIG. 1, the first stereo camera 102 is a left stereo camera, and the second stereo camera 106 is a right stereo camera. FIG. 3A shows an example of a left image 300 and a right image 302 respectively captured by first stereo camera 102 and second stereo camera 106 of FIG. 1.

Figure 3B:
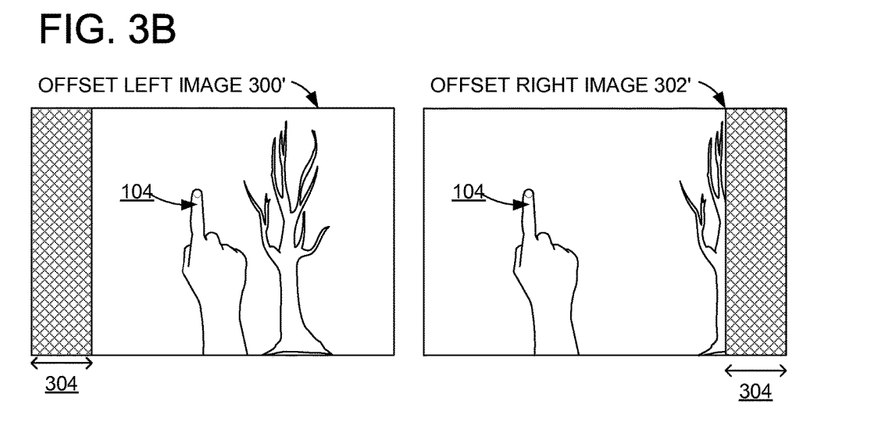
Figure 3C:
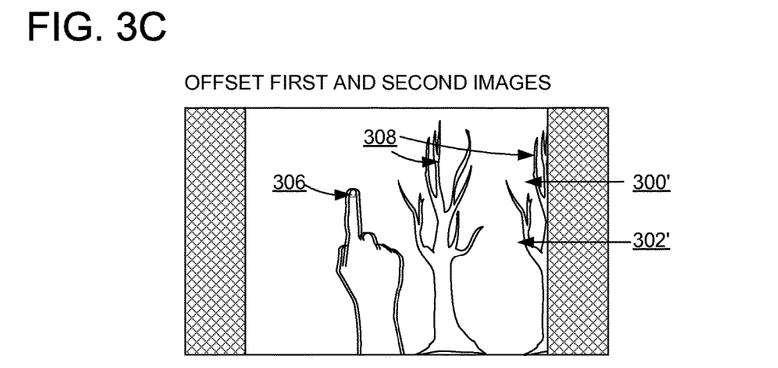

Objects in the relative location of the first image and second image depict a same object locus when the objects are at an assumed distance and the first and second images are offset by an amount derived from this distance. For example, as shown in FIGS. 3A-3C, the assumed distance is the approximate length of the user's reach and the target object is the user's finger 104. Because the target object is finger 104, the left image 300 and the right image 302 may be offset by offset distance 304 so as to depict finger 104 in the same region in offset left image 300' and offset right image 302'. FIG. 3B shows the offset left image 300' and offset right image 302' being cropped by an offset distance 304 that allows the same object locus to be depicted in the same region of the offset images. A left portion of offset left image 300' is cropped, while a right portion of offset right image 302' is cropped. As shown in FIG. 3C, finger 104 is depicted in the same region 306 in the offset left and right images 300' and 302'. However, because the background tree 308 is not at or near the assumed distance, the background tree 308 is not depicted in the same region in the offset left and right images.

The disparity between objects in the left image and the right image is inversely related to the distance between the stereo cameras and the target object. For example, objects that are relatively near to the stereo cameras will appear to have a greater disparity between depicted objects than objects that are relatively far from the stereo cameras.

In some examples, region 306 may be a corresponding pixel in the offset left and right images 300' and 302'. For example, region 306 may be the same pixel (e.g., pixel $N_x$, $N_y$) in the left image and the right image after cropping the images by the offset distance 304. Accordingly, at 206, method 200 of FIG. 2 includes offsetting the first image relative to the second image by an offset distance selected such that each corresponding pixel of offset first and second images depict a same object locus if the object locus is at an assumed distance from the first and second stereo cameras.

Any suitable distance may be used as an assumed distance. In the above example, the assume distance is the approximate length of the user's reach when performing finger gestures. As another example, when augmented reality images are interactive targets activated by the user's finger gestures, the assumed distance may be the apparent distance to such an augmented reality interactive target.

Figure 4:
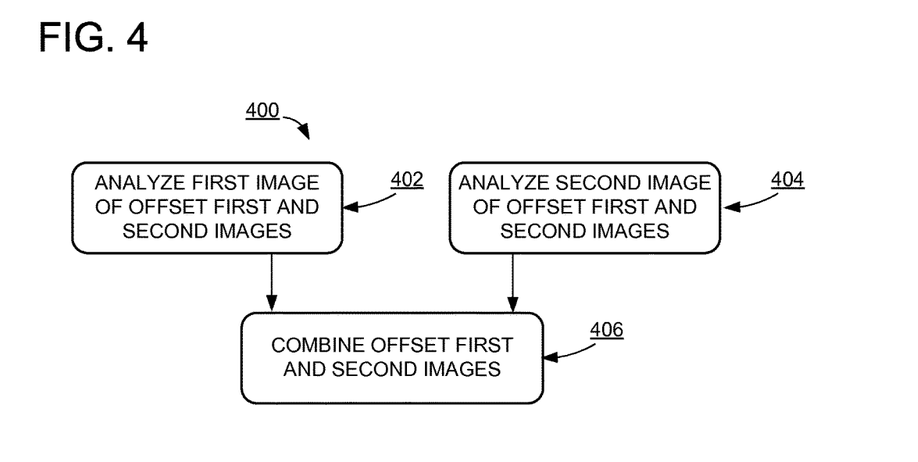
FIG. 4 shows an example method of analyzing offset first and second images.

At 208, method 200 includes locating a target object in the offset first and second images. FIG. 4 shows an example method 400 of locating a target object in the offset first and second images. Locating a target object may include several operations in which the offset first and second images are analyzed independently. Therefore, at 402, method 400 includes analyzing the first image of the offset first and second images, and at 404, method 400 includes analyzing the second image of the offset first and second images.

Analysis of the offset first and second images may include application of a plurality of different machine-learning trained classifiers trained for object detection using training objects (i.e., a plurality of different fingers). The machine-learning trained classifier may be configured to analyze an image and output a heat map that includes a relative confidence of object detection for each pixel correlated to the corresponding pixel in the analyzed image. When the training object is similar to the object being detected, a high confidence results. However, objects that are different from the training object in shape, size, and orientation may result in low confidences.

Figure 5A:
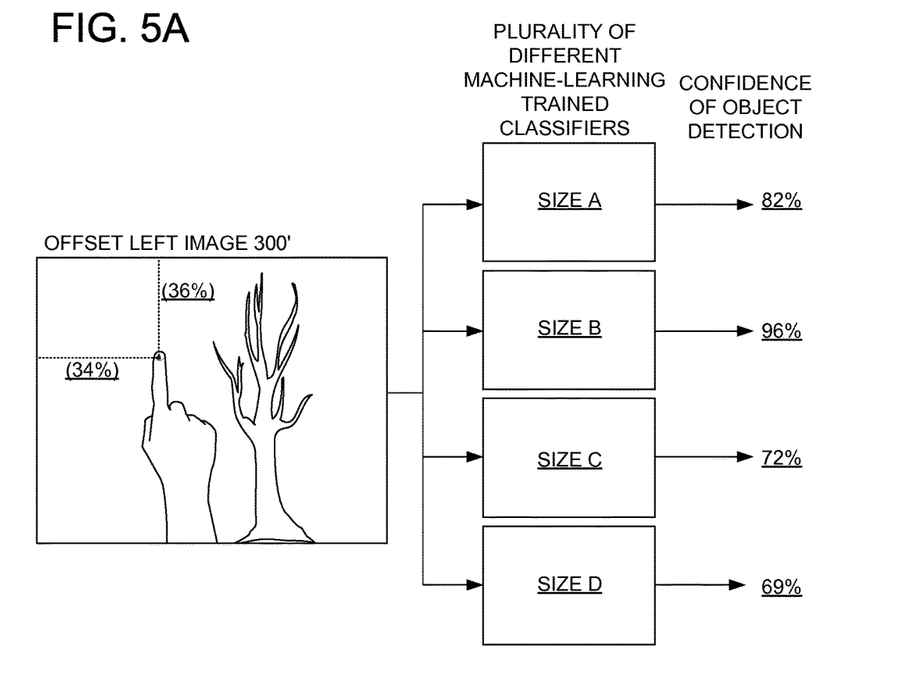
FIG. 5A shows a plurality of different machine-learning trained classifiers trained for detecting objects of different sizes in the offset first and second images.

For example, to accommodate variations in object size, the same image may be input to each of a plurality of different machine-learning trained classifiers trained for detecting an object of a different size than other of the plurality of machine-learning trained classifiers. For example, FIG. 5A shows offset left image 300' input into a plurality of different machine-learning trained classifiers trained for detecting various finger sizes (e.g., sizes A-D). FIG. 5A also shows the plurality of different machine learning trained classifiers each outputting a confidence of object detection (e.g., 82%, 96%, 72%, and 69%) for the region of offset left image 300' that is 34% from the left edge of the image in the x-direction and 36% from the top edge of the image in the y direction. As shown, the highest confidence of object detection for the region at 34%, 36% is calculated by the machine-learning trained classifier trained to detect fingers of size B. Such a confidence may be output for each region of the analyzed image. For example, a heat map may record the highest confidence for each pixel or region of the analyzed image.

Figure 5B:
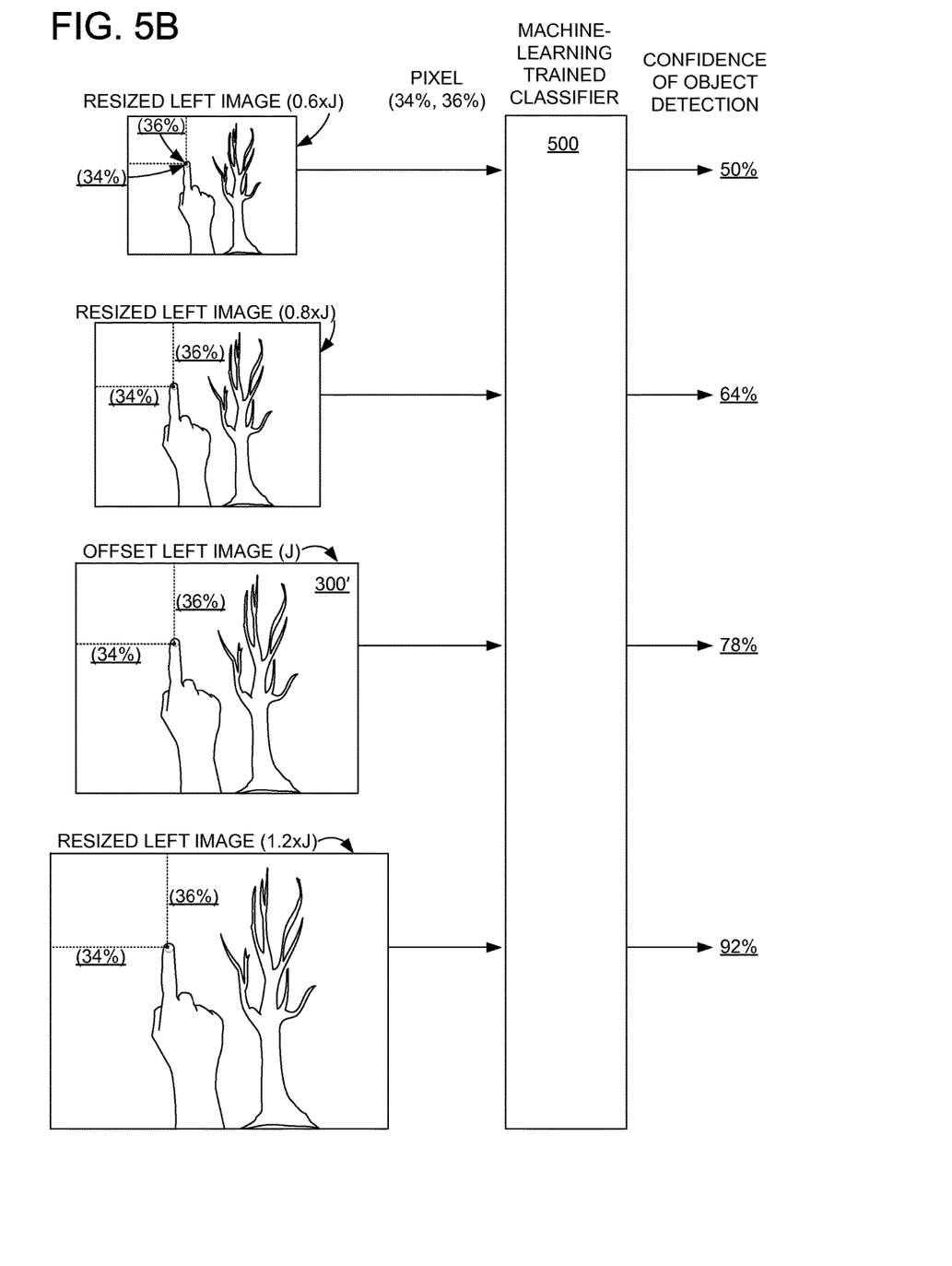
FIG. 5B shows an example machine-learning trained classifier analyzing differently scaled versions of the same image.

As another example, to accommodate variations in object size, a source image may be scaled to a plurality of different resolutions, and the same machine-learning trained classifier may be applied to each image in the scaled set of offset first and second images. For example, FIG. 5B shows an example of resizing the offset left image 300' (shown as resolution J in offset left image (J)) to produce three other corresponding images of varying resolution (resized left image (1.2xJ), resized left image (0.8xJ), and resized left image (0.6xJ)). All four images may be analyzed by the same machine-learning trained classifier 500. As shown, the highest confidence of object detection for the region at 34%, 36% is calculated based on analysis of left image (1.2xJ). Such a confidence may be output for each region of the analyzed image. For example, a heat map may record the highest confidence for each pixel or region of the analyzed images.

Figure 6A:
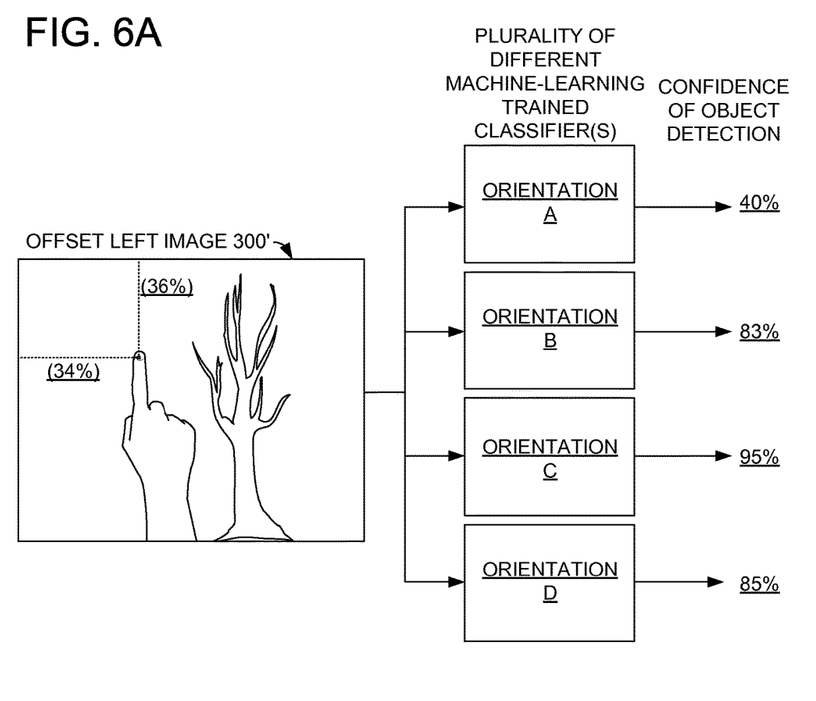
FIG. 6A shows a plurality of different machine-learning trained classifiers trained for detecting objects of different orientations.

As yet another example, to accommodate variations in object orientation, the same image may be input to each of a plurality of different machine-learning trained classifiers trained for detecting an object of a different orientation than other of the plurality of machine-learning trained classifiers. For example, FIG. 6A shows offset left image 300' input into a plurality of different machine-learning trained classifiers trained for detecting fingers having different orientations. As shown, the highest confidence of object detection for the region at 34%, 36% is calculated by the machine-learning trained classifier trained to detect fingers having orientation C. Such a confidence may be output for each region of the analyzed image. For example, a heat map may record the highest confidence for each pixel or region of the analyzed image. Further, a sister heat map may be generated to identify, for each pixel or region, which orientation resulted in the highest confidence for that pixel or region.

Figure 6B:
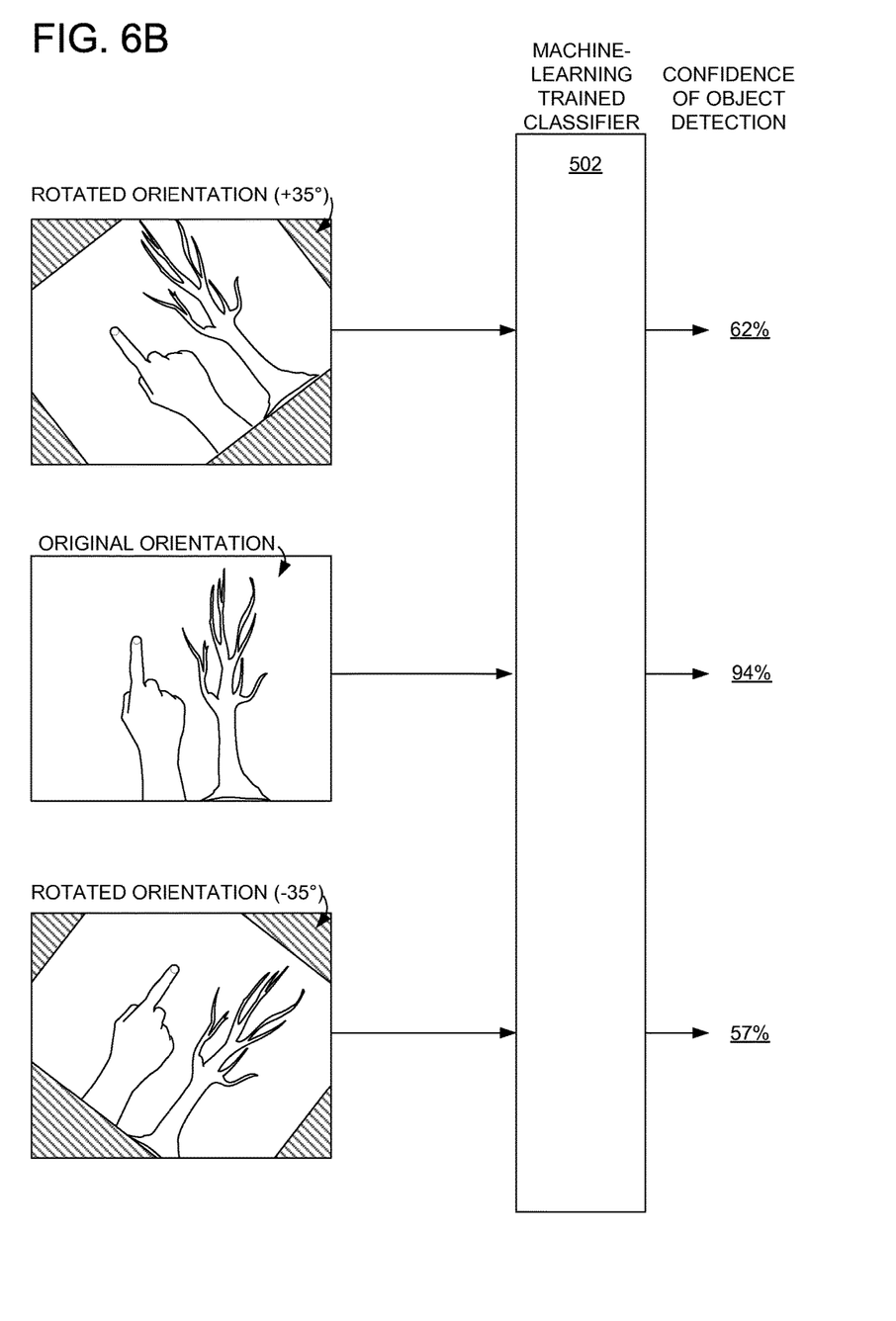
FIG. 6B shows an example machine-learning trained classifier analyzing differently rotated versions of the same image.

Finally, to accommodate variations in object orientation, a source image may be rotated to a plurality of different orientations, and the same machine-learning trained classifier may be applied to each member in the rotated set of offset first and second images. For example, FIG. 6B shows an original orientation for the offset left image, and two rotated orientations (e.g., rotated orientation (+35°) and rotated orientation (−35°)) being input into machine-learning trained classifier 502. As shown, the highest confidence of object detection for an analyzed region is calculated based on analysis of the original image. Such a confidence may be output for each region of the analyzed image. For example, a heat map may record the highest confidence for each pixel or region of the analyzed images.

One or more of the above described analysis may be performed to estimate a likelihood of object detection for each region of an analyzed image. When two or more different analysis are performed, two or more different corresponding confidences may be produced. In general, if multiple confidences are generated for a pixel or region, the highest confidence for that pixel or region is correlated to that pixel or region. For example, using the examples discussed above, the confidence of 96% corresponding to the machine-learning trained classifier trained to detect objects of size B (of FIG. 5A) would be correlated to the pixel at 34%, 36%.

Correlated confidences may be used in combination with adjacent correlated confidences to smooth correlated confidences for each of the offset first and second images. For example, the confidence value of 96% for the pixel at 34%, 36% of FIG. 5B may be smoothed with the correlated confidences of the eight nearest neighbor pixels around the pixel at 34%, 36% using a Gaussian smoothing operation.

Smoothing correlated confidences may also occur across different resolutions. For example, the correlated confidence from the offset left image (J) of 78% may be smoothed with the resized left image (0.8xJ) correlated confidence of 64% and the resized left image (1.2xJ) correlated confidence of 92% using a Gaussian smoothing operation. Smoothing correlated confidences across resolutions may include using all eighteen nearest neighbor pixels in the smaller and larger resolution images.

The above provided examples discuss analysis of the offset left image 300'. The same type of analysis may also be performed on the offset right image 302'. The independent analysis of the left and right images may be followed by a combination operation in which the correlated confidences of object detection in the offset left and right images are combined to determine one or more candidate object locations. As such, returning to FIG. 4, at 406, method 400 includes combining offset first and second images. For example the correlated confidence of object detection in the first image may be combined with the correlated confidence of object detection in the second image to yield a combined confidence of object detection for each corresponding pixel or region in the offset first and second images.

Figure 7:
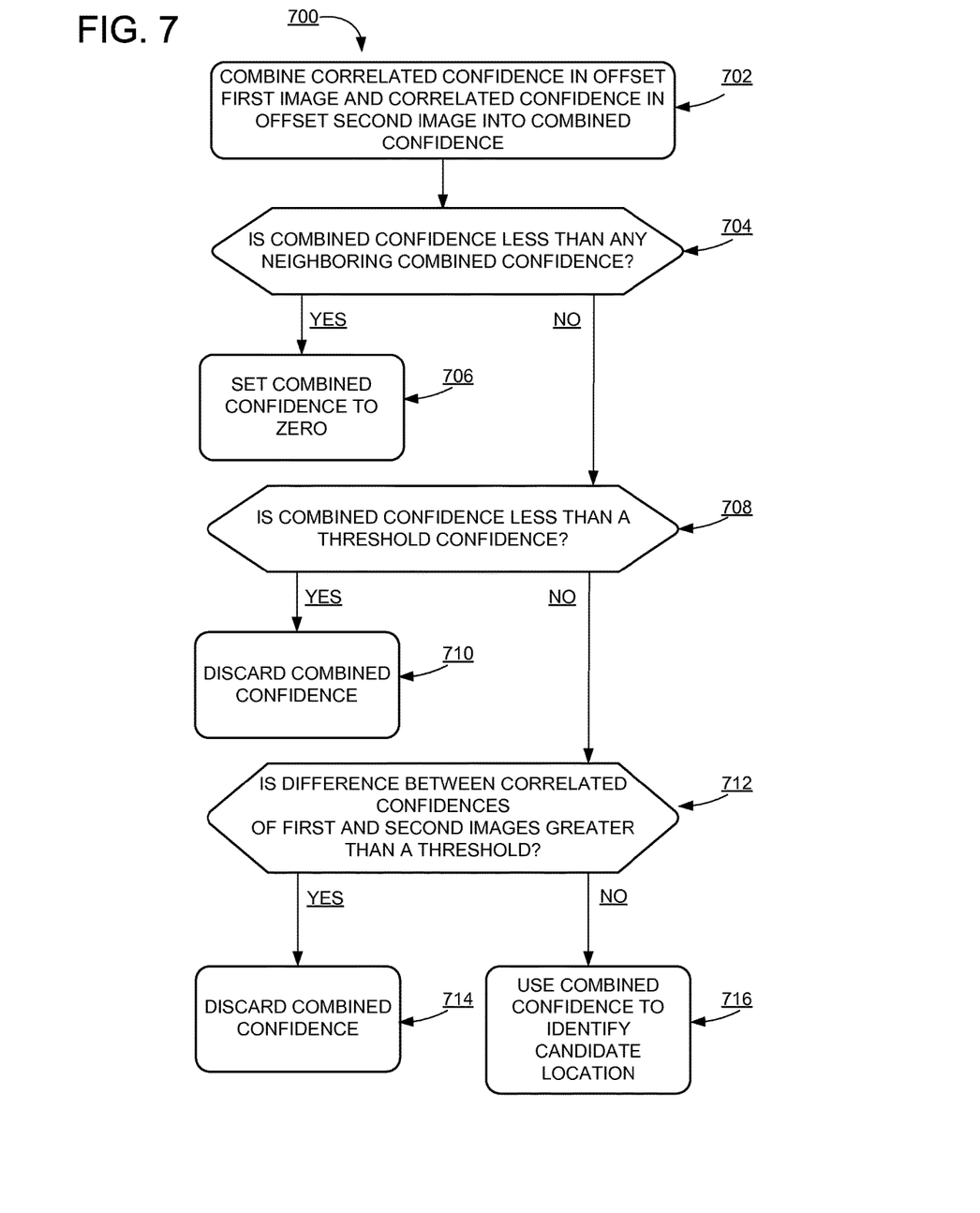
FIG. 7 shows an example method of combining correlated confidences in the offset first and second images to yield a combined confidence of object detection.

FIG. 7 shows an example method 700 of combining correlated confidences of the first image and the second image. At 702, method 700 includes combining the correlated confidence in the offset first image and the correlated confidence in the offset second image (e.g., offset left image 300' and offset right image 302' of FIG. 3B). In some examples, combining may include averaging the correlated confidence of object detection in the offset first image and the correlated confidence of object detection in the offset second image. However, other combining techniques may also be used without departing from the scope of this disclosure.

Following combination of correlated confidences a suppression may be performed on the combined confidence. As such, at 704, method 700 includes determining if a given pixel has a combined confidence that is less than a combined confidence of any neighboring pixels. If the combined confidence is less than the combined confidence of one or more neighboring pixels, the combined confidence may be set to zero, as shown at 706 in method 700. However, if the combined confidence is greater than the combined confidence of all neighboring pixels, the combined confidence may be used in further analysis.

At 708, method 700 includes determining if the combined confidence is less than a threshold confidence. As shown at 710, if the combined confidence is less than the threshold confidence, method 700 includes discarding combined confidences that are less than the threshold. For example, if the threshold confidence is 75%, the correlated confidence in the first image is 80%, and the correlated confidence in the second image is 65%, the averaged combined confidence of 72.5% does not meet the threshold confidence and may be discarded. However, if the combined confidence is greater than the threshold confidence, the combined confidence may be used for further analysis.

At 712, method 700 includes determining if the difference between correlated confidences of object detection in the first and second images is greater than a threshold. Such a threshold may describe the maximum allowable disparity between the correlated confidence in the first image and the correlated confidence in the second image. When the disparity between the correlated confidences is greater than the threshold, at 714, method 700 includes discarding the combined confidence. For example, the threshold may be 25%, the correlated confidence in the first image may be 99%, and the correlated confidence in the second image may be 70%. Therefore, the disparity between correlated confidences of 29% is greater than the threshold and the combined confidence may be discarded. However, if disparity between correlated confidences is less than the threshold the combined confidence may be used for further analysis.

In contrast, if both thresholds are met, at 716, method 700 includes using the combined confidence to identify candidate regions in one or both of the first image or the second image that may include a target object. A finger location may be recognized based upon the confidence of finger detection from the image compared to the combined confidence heat map.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
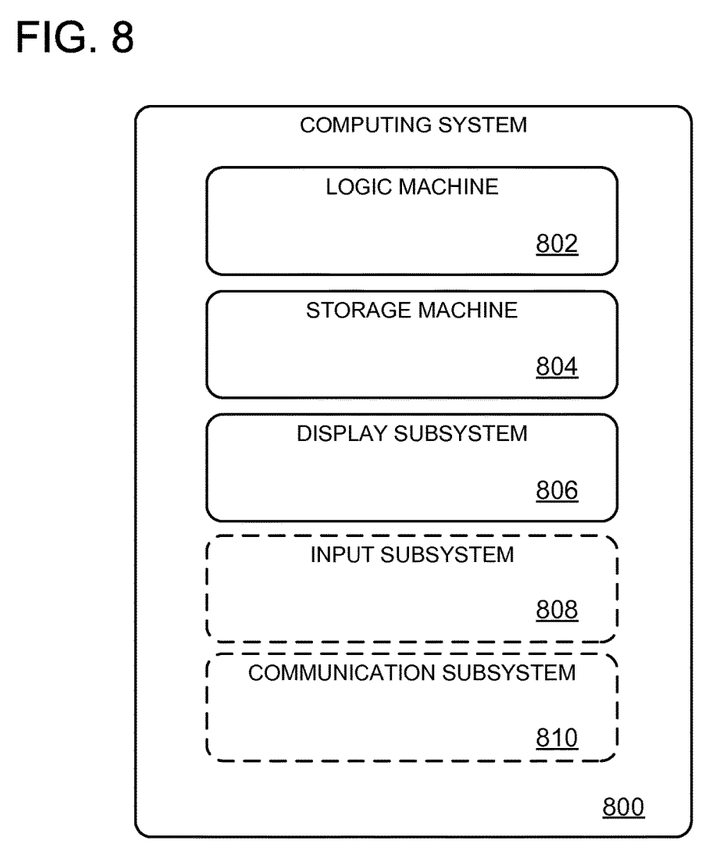
FIG. 8 shows an example computing system used for object detection.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic machine 802 and a storage machine 804, and a display subsystem 806 (e.g., see-through display 110 of FIG. 1). Computing system 800 may optionally include an input subsystem 808, communication subsystem 810, and/or other components not shown in FIG. 8.

Logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 804 includes one or more physical devices configured to hold instructions executable by the logic machine to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of virtual or augmented reality display technology. Such display devices may be combined with logic machine 802 and/or storage machine 804 in a shared enclosure, or such display devices may be peripheral display devices.

When included, input subsystem 808 may comprise or interface with one or more user-input devices. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, steroscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of object detection, the method comprising:
receiving a first image taken from a first perspective by a first camera of a head mounted display;
receiving a second image taken from a second perspective, different from the first perspective, by a second camera of the head mounted display;
offsetting each pixel in the first image relative to a corresponding pixel in the second image by a predetermined offset distance resulting in offset first and second images, wherein a particular pixel of the offset first image depicts a same object locus as a corresponding pixel in the offset second image only if the object locus is at a desired object-detection distance from the head mounted display;
applying a machine-learning trained classifier to the offset first image to determine a first confidence of object detection for each pixel in the offset first image;
applying the machine-learning trained classifier to the offset second image to determine a second confidence of object detection for each pixel in the offset second image;
for each pixel in the offset first image, correlating the first confidence of object detection to the second confidence of object detection of a corresponding pixel in the offset second image; and
based on the first confidence, the second confidence, and correlation between the first and second confidences, identifying one or more pixels in the offset first and second images as depicting a target object.

2. The method of claim 1, further comprising smoothing the first and second confidences for each of the offset first and second images.

3. The method of claim 1, wherein the machine-learning trained classifier is one of a plurality of different machine-learning trained classifiers applied to the offset first and second images, each of the plurality of different machine-learning trained classifiers determining first and second confidences of object detection for each pixel in the offset first and second images, and where a highest confidence for each pixel is correlated to that pixel.

4. The method of claim 3, wherein each of the plurality of different machine-learning trained classifiers are trained for detecting an object at an orientation different than other of the plurality of different machine-learning trained classifiers.

5. The method of claim 3, wherein each of the plurality of different machine-learning trained classifiers are trained for detecting an object of a different size than other of the plurality of different machine-learning trained classifiers.

6. The method of claim 1, wherein the machine-learning trained classifier is applied to a set of offset first and second images, each offset first and second images of the set scaled to a different resolution as a scaled offset first and second images.

7. The method of claim 6, further comprising correlating a confidence of object detection to each region of the offset first and second images, the confidence derived from the scaled offset first and second images of the resolution having a highest confidence of object detection for that region.

8. The method of claim 6, further comprising smoothing a correlated confidence across different resolutions.

9. The method of claim 1, wherein the machine-learning trained classifier is applied to a set of offset first and second images, each member of the set rotated to a different orientation.

10. The method of claim 1, further comprising combining a correlated confidence of object detection in the first image and a correlated confidence of object detection in the second image into a combined confidence of object detection for each corresponding pixel in the offset first and second images.

11. The method of claim 10, wherein combining includes averaging the correlated confidence of object detection in the first image and the correlated confidence of object detection in the second image.

12. The method of claim 10, further comprising discarding one or more combined confidences that are less than a threshold confidence.

13. The method of claim 10, further comprising discarding one or more combined confidences if the difference between correlated confidences of object detection in the first image and the second image is greater than a threshold.

14. A head mounted display, the head mounted display comprising:
a see-through display;
a first camera configured to capture a first image from a first perspective;
a second camera configured to capture a second image from a second perspective, different from the first perspective;
a logic machine; and
a storage machine including instructions executable by the logic machine to:
receive the first image taken by the first camera;
receive the second image taken by the second camera;
offset each pixel in the first image relative to a corresponding pixel in the second image by a predetermined offset distance resulting in offset first and second images, wherein a particular pixel of the offset first image depicts a same object locus as a corresponding pixel in the offset second image only if the object locus is at a desired object-detection distance from the first and second cameras;
apply a machine-learning trained classifier to the offset first image to determine a first confidence of object detection for each pixel in the offset first image;
apply the machine-learning trained classifier to the offset second image to determine a second confidence of object detection for each pixel in the offset second image;
for each pixel in the offset first image, correlate the first confidence of object detection to the second confidence of object detection of a corresponding pixel in the offset second image; and
based on the first confidence, the second confidence, and correlation between the first and second confidences, identify one or more pixels in the offset first and second images as depicting a target object.

15. The head mounted display of claim 14, wherein the storage machine includes further instructions executable by the logic machine to output a heat map that includes a relative confidence of object detection for each pixel in the offset first and second images.

16. A method of finger detection, the method comprising;
receiving a first image taken from a first perspective by a first camera of a head mounted display;
receiving a second image taken from a second perspective, different from the first perspective, by a second camera of the head mounted display;
offsetting each pixel in the first image relative to a corresponding pixel in the second image by a predetermined offset distance resulting in offset first and second images, wherein a particular pixel of the offset first image depicts a same finger locus as a corresponding pixel in the offset second image only if the finger locus is at a known reach distance of a wearer of the head mounted display;
applying a machine-learning trained classifier to the offset first image to determine a first confidence of finger detection for each pixel in the offset first image;
applying the machine-learning trained classifier to the offset second image to determine a second confidence of finger detection for each pixel in the offset second image;
for each pixel in the offset first image, correlating the first confidence of finger detection to the second confidence of finger detection of a corresponding pixel in the offset second image; and
based on the first confidence, the second confidence, and correlation between the first and second confidences, identifying one or more pixels in the offset first and second images as depicting a finger of the wearer of the head mounted display device.

17. The method of claim 16, wherein the machine-learning trained classifier is one of a plurality of machine-learning trained classifiers, each of the plurality of machine-learning trained classifiers trained for detecting a finger at a different orientation, and wherein each of the plurality of machine-learning trained classifiers are applied to each offset first and second images of a set of offset first and second images, each offset first and second images of the set scaled to a different resolution.

18. The method of claim 17, further comprising correlating a highest confidence of finger detection from the different orientations and resolutions to each region of the offset first and second images.

19. The method of claim 16, further comprising using either the first confidence of finger detection or the second confidence of finger detection to identify one or more candidate regions in either the first image or the second image, and recognizing a finger location based on the confidence of finger detection from that image.

* * * * *